United States Patent Office

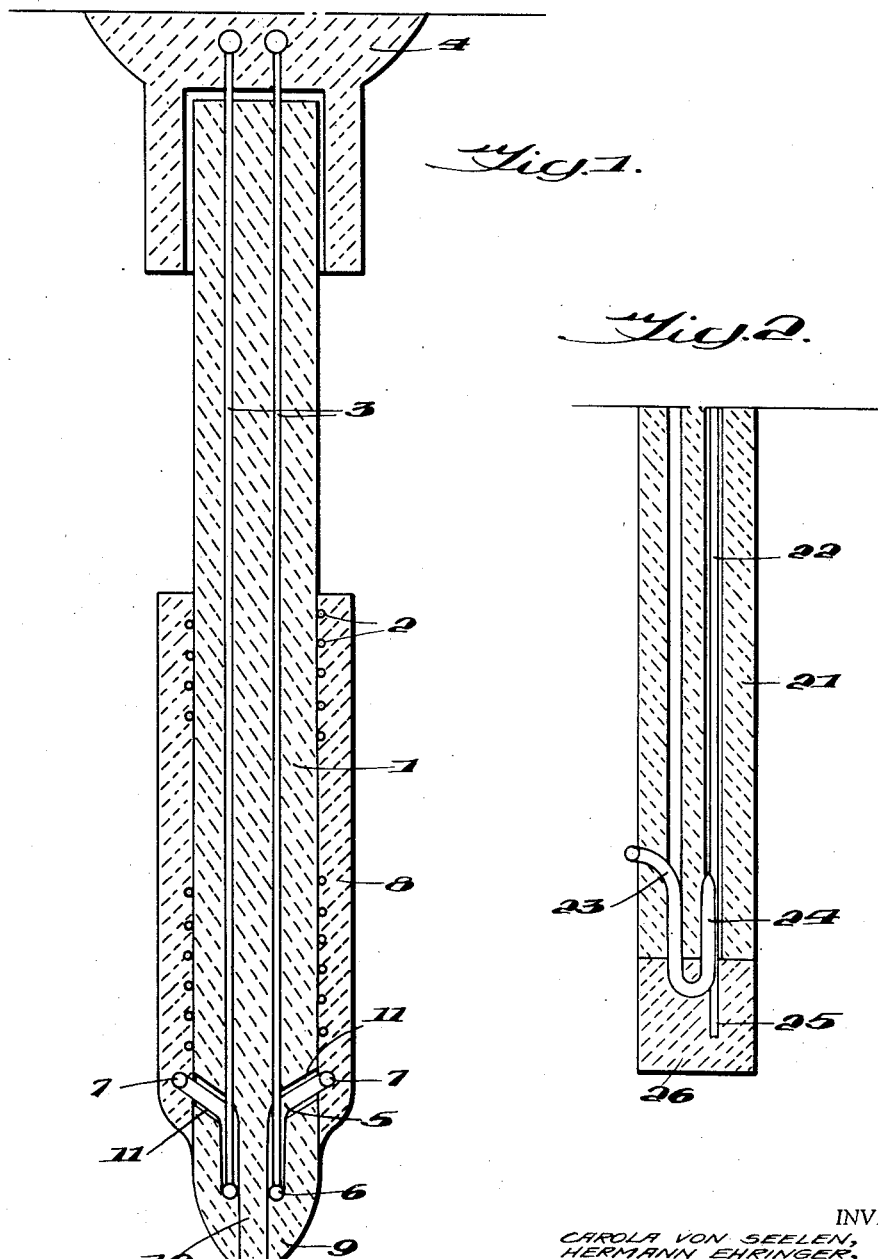

2,802,925
Patented Aug. 13, 1957

2,802,925

RESISTANCE THERMOMETER

Carola Von Seelen, Hermann Ehringer and Alfred Boettcher, Hanau (Main), Germany, assignors to Deutsche Gold- und Silber Scheideanstalt vormals Roessler, Frankfurt am Main, Germany Application March 11, 1955, Serial No. 493,703

Claims priority, application Germany March 13, 1954

3 Claims. (Cl. 201—63)

The present invention relates to improvements in resistance thermometers and more particularly to platinum resistance thermometers adapted for measurement of high temperatures of 750° C. and over which comprise a refractory ceramic carrier upon which the measuring winding of platinum or platinum rich alloy is wound and a protective ceramic coating over such winding.

In view of their high precision, platinum (including platinum alloy) resistance thermometers are an indispensible instrument in technology. However, their use at high temperatures, especially those above 750° C., cause difficulties as the measuring winding is sensitive to the temperatures necessary for their production and use and their mechanical and electrical properties can change during use. There have been attempts to prevent attack by the furnace atmosphere or the medium whose temperature is to be measured which is especially damaging at higher temperatures by providing a protecting coating of a refractory ceramic material for the measuring winding. When aluminum oxide is employed for such coating, it is necessary to employ exceedingly high temperatures when sintering on the coating in order than an impervious coating be obtained, which are near the melting point of the platinum and not only effect an uncontrollable alteration in the structure of the platinum but also can effect a reciprocal action between the platinum and the carrier or the coating. When lower temperatures are employed the coating obtained remains porous and does not sufficiently protect the platinum winding. Such porous coatings have been provided with a glaze to render them more impervious but even then the coating is not completely satisfactory.

In accordance with the invention it was found that if a particular grain structure was imparted to the platinum or platinum rich alloy employed for the measuring winding that such platinum winding would not only be more resistant to chemical and thermal attack but also that the measuring winding would not undergo substantial change during continued use at high temperatures. The stable structure which is imparted to the platinum provides an advantageous improvement in the reproducibility of the temperature measurements even at high temperatures as such structure prevents uncontrolled thermal changes. In accordance with the invention, the finished measuring winding, which is composed of a relatively thin extended platinum resistance element, preferably after it has been applied to the support therefor, is given a treatment whereby a coarse crystalline structure is imparted to the platinum or platinum alloy employed in the winding in which the individual crystals are so dimensioned that the majority thereof reach across the smallest dimension of the winding. For example, when platinum wire is used for the measuring winding, the dimension of the platinum crystals in the direction transverse to the axis of the wire should be practically equal to the diameter of the wire. The length of the crystals along the longitudinal axis of the wire is at least equal to the diameter of the wire or a multiple thereof. When thin platinum bands are employed for the measuring winding, the crystals are of such a size that the majority thereof reach across the thickest diameter of the band. It was found that platinum wires or bands with the coarse crystalline structure described are much less resistive to thermal and chemical attack than those with a fine grained crystalline structure and furthermore that they unexpectedly have a much lower hysteresis effect. In view of their increases resistance to chemical attack there is considerably less danger of a chemical change when protective ceramic coatings are applied thereover at high temperatures.

The coarse crystalline structure in the measuring wires or bands can be obtained by subjecting such wires or bands to an annealing treatment at temperatures which are about 300° C. and more above the recrystallization temperature of the platinum or platinum alloy from which such wires or bands are formed until the desired crystal structure has been produced. For example, when a platinum wire is used, which because of the degree the platinum had been worked recrystallizes at temperatures between 1050° C. and 1250° C., it is necessary to effect the annealing at temperatures between 1350° C. and 1550° C. The duration of the annealing treatment depends upon the temperature used. For instance, a 60 minute treatment is required at 1400° C. to produce the desired crystal structure, whereas at 1550° C. only about 10 minutes are required. The annealing can be effected by indirect heating as well as by direct heating by direct current or high or medium frequency current resistance heating.

While the above described coarse grained structure is of advantage in all types of measuring windings for platinum resistance thermometers which are to be used at high temperatures, it was found that a special type of monofilar winding was of special significance in the production of a sensitive thermometer.

In the past, platinum resistance thermometers were generally constructed in such a way that the measuring winding was wound on a support and its ends welded or soldered to the ends of the lead-in wires connecting such winding with the measuring instrument which wires are supported in a separate insulating support. The result of this was that the two part structure was primarily connected through the relatively weak welded or soldered joints between the ends of the measuring winding and the lead-in wires so that it was generally necessary to enclose such structure in a protective ceramic or metal tube. The use of such protective tubes however slowed the response of the thermometer to changes in temperature. Attempts to avoid the necessity of using such protective tubes by employing collar shaped protectors at the joint between the measuring winding and the lead-in wires did not lead to much success as they proved insufficiently resistant to shocks.

In accordance with the invention, it was found that these difficulties could be overcome if the insulating support for the lead-in wires and the support for the measuring winding are formed in one piece in that a capillary tube containing a plurality of capillaries is employed to support both the lead-in wires and the measuring winding in that the lead-in wires pass through the capillaries in the tube and the measuring winding is wound and fixed on the outside of the tube. Lateral openings are provided in the tube connecting the capillaries containing the lead-in wires with the exterior of the tube which permit joining of the ends of the measuring winding with the lead-in wires either in such openings or in the capillaries themselves. The ends of the measuring winding can be welded or soldered directly to the lead-in wires or relatively short connecting wires can be provided between the lead-in wires and the ends of the measuring winding. In general, the latter modification of the use of such connecting wires has proved very expedient.

The construction of the resistance thermometer according to the invention, wherein a unitary support is employed for both the lead-in wires and the measuring winding, provides considerable technical advantages from two points of view. First of all, because of its rigid construction, it can be used without a protective tube and consequently be very responsive to temperature changes. Furthermore, it is especially adapted for use in locations where strong shocks, oscillations and the like can occur as these cannot cause damages to the joints between the measuring winding and the lead-in wires. In view of the differences in coefficients of expansion, it was previously not thought possible to be able to produce a resistance thermometer in which the measuring winding, as well as all of the joints between the measuring winding and lead-in wires, are firmly embedded in the usual protective coating materials without permitting equalization of the thermal stresses. It was however found that thermometers with the rigid construction described did not fail during use.

In thermometers in which a bifilar measuring winding is employed, the lead-in wires can be connected either to the upper or lower end of the winding. Preferably, however, with bifilar measuring windings, the connection with the lead-in wires is made at the lower end of the winding. In monofilar windings in which the connections with the lead-in wires is made at opposite ends of the winding, one of the connections can be made at the lower end of the supporting capillary tube and the other can be made through an opening in the side of the tube at an appropriate distance above the end of the tube. In every instance it is preferable to embed the joints and fix them to the support with a ceramic or glass-like embedding material so that they are not only protected against corrosive influences but also against shock.

Ceramic coatings of all sorts can be employed as protective coatings for the platinum measuring windings according to the invention as long as they can provide an impervious covering coating without deleteriously attaching on the platinum and they do not deleteriously affect the accuracy of the thermometer during continued use. However, it was found that coatings composed of calcium oxide, beryllium oxide, aluminum oxide and magnesium oxide in certain proportions and, in addition thereto, at least two further oxides selected from the group consisting of titanium oxide, zirconium oxide, barium oxide, boron trioxide and silicon dioxide were especially suited for the purposes of the invention.

The proportions of the four basic oxides employed in such coating compositions according to the invention are as follows:

| | Mol percent |
|---|---|
| Beryllium oxide | 5–50 |
| Calcium oxide | 10–40 |
| Aluminum oxide | 3–30 |
| Magnesium oxide | 5–25 |

The following composition is especially adapted for the production of coating compositions especially adapted for the resistance thermometers according to the invention which are to be used at high temperatures:

| | Mol percent |
|---|---|
| Beryllium oxide | 10–30 |
| Calcium oxide | 14–30 |
| Aluminum oxide | 3–30 |
| Magnesium oxide | 8–18 | and two oxides selected from the group consisting of titanium oxide, zirconium oxide, barium oxide, boron trioxide and silicon dioxide.

The preferred compositions are of the following composition:

| | Mol percent |
|---|---|
| Beryllium oxide | 15–25 |
| Calcium oxide | 14–30 |
| Aluminum oxide | 15–30 |
| Magnesium oxide | 8–13 |
| Zirconium oxide | 5–12 |
| Titanium oxide | 5–12 |
| Silicon dioxide | 5–12 |

The aforementioned oxide mixtures can be applied at temperatures at which they are completely fused. However, temperatures also can be employed which only effect a surface fusion whereas the portions underlying the fused surface are solidified by fritting or sintering. Expediently, a well mixed and uniformly sieved mixture of such oxides is converted into a slurry with the aid of a binder and such slurry is painted or sprayed on the measuring winding and subsequently coalesced by being fused or sintered thereon. The binder employed is one that does not remain in the composition during the sintering or fusion thereof. So far as the temperature required for the application of the coating correspond to those required for converting the winding to the coarse crystalline form described, the sintering or fusion of the coating and the annealing of the measuring winding can be combined in one step, for example, by annealing at temperatures between 1500 and 1600° C. It is however also possible to convert the winding into the coarse crystalline form first and then to fuse on the coating over the thus treated winding at a different temperature if the composition of the coating material so requires.

The coatings according to the invention effectively prevent attack on the platinum winding by the media whose temperature is to be measured at temperatures of 1000° C. and over. The melts of the oxide mixtures described furthermore are platinum repellent and consequently increase the constance of the TK value of the thermometer. Their coefficients of expansion are substantially the same as those of the supports for the windings which can consist of aluminum oxide or other high melting oxides or oxide mixtures so that damage to the coating by differing thermal coefficients of expansion can be avoided. The conductivity of such coatings is furthermore so slight that even at temperatures of 1000° C. and above it does not influence the resistance thermometer curve.

The following are further examples of compositions suitable for protective coatings for the measuring windings according to the invention:

| | 1 Mol percent | 2 Mol percent | 3 Mol percent | 4 Mol percent |
|---|---|---|---|---|
| calcium oxide | 20 | 22.6 | 20 | 28 |
| beryllium oxide | 25 | 46.9 | 5 | 20 |
| magnesium oxide | 12 | 12.2 | 20 | 10 |
| aluminum oxide | 18 | 4.4 | 18 | 25 |
| titanium dioxide | 5 | 3.8 | 5 | 5 |
| zirconium dioxide | | | 20 | 7 |
| barium oxide | 15 | 6.4 | 7 | |
| silicon dioxide | 5 | 3.7 | 5 | 5 |

The accompanying drawings will serve to illustrate several modifications of the invention:

Fig. 1 diagrammatically illustrates one form of platinum resistance thermometer according to the invention;

Fig. 2 diagrammatically illustrates a preferred manner of joining the platinum resistance winding to the lead-in wire; and Referring to the drawings, Fig. 1 shows a modification of a thermometer according to the invention in which the joint between the bifilar measuring winding and the lead-in wires is situated at the lower end of the support. In this figure, 1 represents the support of aluminum oxide which is in the form of a capillary tube supporting the measuring winding 2 and contains two capillaries which serve to hold the lead-in wires 3 which are connected to the external circuit in connecting head 4. The length of lead-in wires 3 is such that they project from the lower end of support 1 and are there joined with connector wires 5 by the soldered or welded joints 6. The other ends of connector wires 5 are joined to the ends of measuring winding 2 by soldered or welded joints 7. The measuring winding 2 is coated with a coating composition 8 of one of the oxide mixtures described above which has been fused on. Other usual coating compositions, such as, high melting glass or other material which is temperature stable and electrically indifferent, can also be used. The coating 8 also fixes joints 7 in the support. Joints 6 are fixed on the lower end of support 1 by a covering mass 9 which is similar to that employed for coating 8 but preferably has a slightly lower melting point. Elongated portion 10 of support 1 serves to reenforce the bond between the support and the covering mass 10.

In the production of the resistance thermometer described, the platinum measuring wire 2 is wound upon support 1 and the ends thereof soldered to connecting wires 5, which are lead to the capillaries through openings 11. The resistance of the winding is then adjusted to the desired value and annealed to provide the desired coarse grained crystalline structure at 1500° C. and coated together with the joints 7 by the insulating and protective coating 8. Thereafter, the other ends of connecting wires 5 are soldered or welded to the lead-in wires 3 to provide joints 6 and such joints are then covered and fixed to support 1 by the covering mass 9.

A simplified modification of the joint between the lead-in wires and connecting wires is shown in Fig. 2 in which 21 represents the support, 22 the lead-in wire held in a capillary of the support and 23 the connecting wire serving to connect the lead-in to the measuring winding. Lead-in wire 22 projects from the end of support 21 and is first joined with the connecting wire 23 outside to produce a welded or soldered joint 24. The lead-in wire is then pulled up to draw joint 24 into the capillary, and the still projecting end of lead-in wire 22 is then embedded in a covering mass 26. Covering mass 26 not only serves to protect joint 24 but also serves to fix the projecting end of the lead-in wire so as to prevent undesired movement thereof.

If desired, it is, of course, possible to provide a plurality of measuring windings upon a single support in the manner described, provided the support contains sufficient capillaries to hold the necessary lead-in wires.

We claim:

1. A platinum resistance thermometer comprising a measuring winding of a relatively thin extended platinum resistance element wound upon a refractory support, said element having a coarse crystalline structure in which the size of the individual crystals in the direction of the thinnest dimension of such element substantially equals such thinnest dimension and the size of the individual crystals in the direction transverse to the thinnest dimension is at least equal to such thinnest dimension, and a protective coating over said winding of a heat coalesced mixture composed of 5 to 50 mol percent of beryllium oxide, 10 to 40 mol percent of calcium oxide, 3 to 30 mol percent of aluminum oxide, 5 to 25 mol percent of magnesium oxide and at least two oxides selected from the group consisting of titanium dioxide, zirconium dioxide, barium oxide, boron trioxide and silicon dioxide.

2. A platinum resistance thermometer comprising a measuring winding of a relatively thin extended platinum resistance element wound upon a refractory support, said element having a coarse crystalline structure in which the size of the individual crystals in the direction of the thinnest dimension of such element substantially equals such thinnest dimension and the size of the individual crystals in the direction transverse to the thinnest dimension is at least equal to such thinnest dimension, and a protective coating over said winding of a heat coalesced mixture composed of 10 to 30 mol percent of beryllium oxide, 14 to 30 mol percent of calcium oxide, 3 to 30 mol percent of aluminum oxide, 8 to 18 mol percent of magnesium oxide and two oxides selected from the group consisting of titanium dioxide, zirconium dioxide, barium oxide, boron trioxide and silicon dioxide.

3. A platinum resistance thermometer comprising a measuring winding of a relatively thin extended platinum resistance element wound upon a refractory support, said element having a coarse crystalline structure in which the size of the individual crystals in the direction of the thinnest dimension of such element substantially equals such thinnest dimension and the size of the individual crystals in the direction transverse to the thinnest dimension is at least equal to such thinnest dimension, and a protective coating over said winding of a heat coalesced mixture composed of 15 to 25 mol percent of beryllium oxide, 14 to 30 mol percent of calcium oxide, 15 to 30 mol percent of aluminum oxide, 8 to 13 mol percent of magnesium oxide, 5 to 12 percent of titanium dioxide, 5 to 12 percent of zirconium dioxide and 5 to 12 percent of silicon dioxide.

References Cited in the file of this patent

UNITED STATES PATENTS

| | | |
|---|---|---|
| 1,247,210 | Black | Nov. 20, 1917 |
| 1,733,752 | Ramage | Oct. 29, 1929 |
| 1,793,672 | Bridgman | Feb. 24, 1931 |
| 1,860,541 | Hebler | May 31, 1932 |
| 2,131,065 | Obermaier | Sept. 27, 1938 |
| 2,444,410 | Keinath | June 29, 1948 |
| 2,528,030 | Burgun | Oct. 31, 1950 |
| 2,685,547 | Holzmann et al. | Aug. 3, 1954 |
| 2,750,483 | Voorman | June 12, 1956 |